(12) United States Patent
Yao (10) Patent No.: US 9,530,564 B2
(45) Date of Patent: Dec. 27, 2016

(54) DIELECTRIC CERAMIC AND MULTILAYER CERAMIC CAPACITOR

(71) Applicant: Murata Manufacturing Co., Ltd., Nagaokakyo-shi, Kyoto-fu (JP)

(72) Inventor: Takayuki Yao, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/869,438

(22) Filed: Sep. 29, 2015

(65) Prior Publication Data

US 2016/0020025 A1    Jan. 21, 2016

Related U.S. Application Data

(63) Continuation of application No. PCT/JP2013/083743, filed on Dec. 17, 2013.

(30) Foreign Application Priority Data

Apr. 8, 2013    (JP) .................................. 2013-080269

(51) Int. Cl.
*C04B 35/00* (2006.01)
*H01G 4/12* (2006.01)
(Continued)

(52) U.S. Cl.
CPC ......... *H01G 4/1227* (2013.01); *C04B 35/4682* (2013.01); *C04B 35/62685* (2013.01); *H01B 3/12* (2013.01); *H01G 4/008* (2013.01); *H01G 4/30* (2013.01); *C04B 2235/3206* (2013.01); *C04B 2235/3217* (2013.01); *C04B 2235/3218* (2013.01); *C04B 2235/3224* (2013.01); *C04B 2235/3236* (2013.01); *C04B 2235/3239* (2013.01); *C04B 2235/3244* (2013.01); *C04B 2235/3267* (2013.01);
(Continued)

(58) Field of Classification Search
CPC ........................... C04B 35/468; C04B 35/4682
USPC ................................... 501/137, 139
See application file for complete search history.

(56) References Cited

U.S. PATENT DOCUMENTS 6,270,906 B1    8/2001  Nakamura et al.
6,853,536 B2 *  2/2005  Nakamura ........... H01G 4/1227
                                            361/301.2
(Continued)

FOREIGN PATENT DOCUMENTS

JP    H11-251173 A    9/1999
JP    2000-154055 A    6/2000
(Continued)

OTHER PUBLICATIONS

International Search issued for PCT/JP2013/083743, date of mailing Apr. 1, 2014.

*Primary Examiner* — Noah Wiese
(74) *Attorney, Agent, or Firm* — Arent Fox LLP (57) ABSTRACT

A dielectric ceramic that contains Al and Si, as well as a barium titanate-based compound having a perovskite type crystal structure as a primary component. The total molar amount of Al and Si is 2 to 4 parts by mole with respect to 100 parts by mole of Ti, and the content ratio of Al with respect to the total molar amount is 0.2 or less (excluding 0) on the molar ratio basis. The dielectric ceramic may also contain at least one specific rare earth element Re, such as Gd, Tb, or Dy.

11 Claims, 1 Drawing Sheet

(51) Int. Cl.
  *H01G 4/30* (2006.01)
  *H01B 3/12* (2006.01)
  *C04B 35/468* (2006.01)
  *C04B 35/626* (2006.01)
  *H01G 4/008* (2006.01)

(52) U.S. Cl.
  CPC ......... *C04B 2235/3418* (2013.01); *C04B 2235/5445* (2013.01); *C04B 2235/6584* (2013.01); *H01G 4/0085* (2013.01)

(56) References Cited

U.S. PATENT DOCUMENTS

| | | | |
|---|---|---|---|
| 7,911,764 B2* | 3/2011 | Sasabayashi | C04B 35/4682 361/321.2 |
| 8,164,880 B2* | 4/2012 | Kang | C04B 35/4682 361/306.1 |
| 2006/0223692 A1 | 10/2006 | Ito et al. | |
| 2008/0112109 A1* | 5/2008 | Muto | C04B 35/4682 361/301.4 |
| 2010/0033895 A1 | 2/2010 | Yao | |
| 2010/0165541 A1 | 7/2010 | Sasabayashi et al. | |
| 2012/0081836 A1* | 4/2012 | Yamaguchi | C04B 35/4682 361/321.4 |
| 2012/0113562 A1* | 5/2012 | Kang | C04B 35/4682 361/321.2 |

FOREIGN PATENT DOCUMENTS

| | | |
|---|---|---|
| JP | 2005-272262 A | 10/2005 |
| JP | 2006-282481 A | 10/2006 |
| JP | 2007-169087 A | 7/2007 |
| JP | 2010-040798 A | 2/2010 |
| JP | 2012-025592 A | 2/2012 |
| WO | WO 2009/037922 A1 | 3/2009 |

* cited by examiner

DIELECTRIC CERAMIC AND MULTILAYER CERAMIC CAPACITOR

CROSS REFERENCE TO RELATED APPLICATIONS

The present application is a continuation of International application No. PCT/JP2013/083743, filed Dec. 17, 2013, which claims priority to Japanese Patent Application No. 2013-080269, filed Apr. 8, 2013, the entire contents of each of which are incorporated herein by reference.

FIELD OF THE INVENTION

The present invention relates to a dielectric ceramic containing a barium titanate-based compound as a primary component and a multilayer ceramic capacitor using this dielectric ceramic.

BACKGROUND OF THE INVENTION

As ceramic materials used for multilayer ceramic capacitors, heretofore, a barium titanate-based compound having a high dielectric constant has been widely known. In addition, as an internal electrode material, a base metal material, such as Ni, which is inexpensive and which has good electrically conductive properties has been widely used.

In this type of multilayer ceramic capacitor, dielectric layers each formed of a dielectric ceramic and internal electrode layers are alternately laminated to each other and are then processed by a firing treatment so as to obtain a ceramic sintered body, and external electrodes are formed on two end portions thereof.

In addition, with the recent advancement of electronic techniques, the reduction in size of a multilayer ceramic capacitor and the increase in capacitance thereof have rapidly progressed.

In addition, with the reduction in size of a multilayer ceramic capacitor and the increase in capacitance thereof, the reduction in thickness of a dielectric ceramic layer also has progressed, and development of a multilayer ceramic capacitor formed of dielectric ceramic layers each having a thickness of 1 µm or less has been aggressively pursued.

Incidentally, when the thickness of the dielectric ceramic layer is reduced, since the electric field to be applied thereto is inevitably increased, it becomes important to ensure the reliability in a high-temperature atmosphere or a high-temperature and high-humidity atmosphere. Since the electric field to be applied is increasingly larger as the thickness of the dielectric ceramic layer is reduced, desired reliability has become difficult to obtain.

Furthermore, in order to obtain a multilayer ceramic capacitor having a large capacitance, an effective area of each of internal electrode layers facing each other is preferably increased. Hence, the reduction in thickness of an external layer portion and the reduction in length from the end portion of the internal electrode layer to the end portion of a ceramic base material have been requested, and a higher humidity resistance has become more difficult to obtain.

In addition, heretofore, it has been aimed to improve the reliability by containing predetermined amounts of various elements in a dielectric ceramic.

For example, Patent Document 1 has proposed a dielectric porcelain composition for a multilayer ceramic capacitor. This dielectric porcelain composition is formed of barium titanate as a primary component and an oxide of Al and contains a plurality of dielectric grains, and those dielectric grains each have an Al concentration which decreases from the surface to the inside of the grain.

According to this Patent Document 1, in order to improve various characteristics, besides the oxide of Al, MgO, $V_2O_5$, $ZrO_2$, an $MnO_2$ are not only contained but rare earth oxides containing rare earth elements, such as Y, Dy, Ho, and Gd, are also contained in the dielectric porcelain composition.

Patent Document 1: Japanese Unexamined Patent Application Publication No. 2006-282481 (claims 1 and 6, paragraph Nos. [0035] to [0047], and the like)

SUMMARY OF THE INVENTION

However, according to Patent Document 1, although TC bias characteristics (temperature characteristics of electrostatic capacitance during direct current application) and temperature dependence of insulating resistance IR are improved by containing predetermined amounts of various elements in the dielectric porcelain composition, when a high electric field is continuously applied for a long time in a high-temperature atmosphere or a high-temperature and high-humidity atmosphere, malfunction may arise, and sufficient reliability may not be ensured in some cases. The reason for this is believed that in Patent Document 1, for example, the grain growth of crystal grains and the sintering properties thereof during firing and the dispersibility of the oxide of Al and the addition components, such as MgO and $MnO_2$, are not sufficiently controlled.

The present invention was made in consideration of the situation as described above and aims to provide a dielectric ceramic which can ensure preferable reliability even if the thickness of a dielectric layer is further reduced, and a high electric field is continuously applied for a long time in a high-temperature atmosphere or a high-temperature and high-humidity atmosphere; and a multilayer ceramic capacitor using the dielectric ceramic described above.

In order to achieve the aim described above, intensive research was carried out using a barium titanate-based compound as a ceramic material, and the present inventor found the following. That is, it was found that when Al and Si are contained as subcomponents, and in addition, the content molar amounts of Al and Si and the content ratios thereof are controlled, the sintering properties and the grain growth during firing can be not only controlled but the dispersibility of those subcomponents can also be controlled, and that hence, even if a high electric field is continuously applied for a long time in a high-temperature atmosphere or a high-temperature and high-humidity atmosphere, malfunction is suppressed from being generated, and a dielectric ceramic having desired reliability can be obtained.

The present invention was made based on the finding described above, and a dielectric ceramic of the present invention contains Al and Si as well as a barium titanate-based compound having a perovskite type crystal structure as a primary component. In the dielectric ceramic described above, the total of the content molar amounts of the Al and the Si with respect to 100 parts by mole of the Ti is 2 parts by mole to 4 parts by mole, and the content ratio of the Al with respect to the total described above is 0.2 or less (excluding 0) on the molar ratio basis.

In addition, although rare earth elements contribute to the improvement in reliability since having a transfer suppression effect of oxygen holes, according to the research result obtained by the present inventor, it was found that among the rare earth elements mentioned above, Gd, Tb, and Dy particularly contribute to the improvement in reliability.

That is, the dielectric ceramic of the present invention preferably contains a rare earth element Re, and the rare earth element Re is preferably at least one type selected from Gd, Tb, and Dy.

In addition, through further intensive research carried out by the present inventor, it was found that besides the above rare earth element Re, when at least one specific rare earth element Re, such as Sm or Eu, Mg, Mn, V, and Zr are contained in predetermined ranges, for example, the dispersibility is improved, and higher reliability can be ensured.

That is, the dielectric ceramic of the present invention preferably contains Mg, Mn, V, Zr, and at least one type of rare earth element Re selected from Sm, Eu, Gd, Tb, Dy, Ho, Er, Tm, Yb, and Lu, and with respect to 100 parts by mole of the Ti, the Mg is 0.10 parts by mole to 2.0 parts by mole, the Mn is 0.01 parts by mole to 0.30 parts by mole, the V is 0.01 parts by mole to 0.30 parts by mole, the Zr is 0.20 parts by mole to 0.80 parts by mole, and the Re is 0.95 parts by mole to 2.0 parts by mole, respectively.

In addition, a multilayer ceramic capacitor of the present invention is a multilayer ceramic capacitor formed of dielectric layers and internal electrode layers alternately laminated thereto, and the dielectric layers are each formed of one of the dielectric ceramics described above.

In addition, through further intensive research carried out for the present invention, it was found that when the thickness of the internal electrode layer of the multilayer ceramic capacitor is set to 0.6 µm or less, significantly preferable reliability can be obtained.

That is, in the multilayer ceramic capacitor of the present invention, the thickness of the internal electrode layer is preferably 0.6 µm or less.

Since the thickness of the internal electrode layer is small, such as 0.6 µm or less, Al in the dielectric ceramic layer is suppressed from diffusing into the internal electrode layer, and a multilayer ceramic capacitor having higher reliability can be obtained.

In addition, in the multilayer ceramic capacitor of the present invention, the internal electrode layer preferably contains Ni as a primary component.

Accordingly, even if inexpensive Ni is used as an internal electrode material, a multilayer ceramic capacitor having high reliability can be obtained.

According to the dielectric ceramic described above, Al and Si are contained as well as a barium titanate-based compound having a perovskite type crystal structure as a primary component, the total of content molar amounts of the Al and the Si is 2 to 4 parts by mole with respect to 100 parts by mole of the Ti, and the content ratio of the Al with respect to the total described above is 0.2 or less (excluding 0) on the molar ratio basis. Hence, the sintering properties and the grain growth during firing can be not only controlled but the dispersibility of Al and Si can also be controlled. Accordingly, even if a high electric field is continuously applied for a long time in a high-temperature atmosphere or a high-temperature and high-humidity atmosphere, a dielectric ceramic which can suppresses the generation of malfunction and which has preferable reliability thereby can be obtained.

In addition, the multilayer ceramic capacitor of the present invention is a multilayer ceramic capacitor which includes dielectric layers and internal electrodes containing Ni or the like as a primary component alternately laminated thereto, and the dielectric layers are each formed of one of the dielectric ceramics described above. Accordingly, even if a high electric field is continuously applied for a long time in a high-temperature atmosphere or a high-temperature and high-humidity atmosphere, malfunction can be suppressed from being generated, so that a multilayer ceramic capacitor having high reliability can be obtained.

DETAILED DESCRIPTION OF THE PREFERRED EMBODIMENTS

Hereinafter, embodiments of the present invention will be described in detail.

A dielectric ceramic according to one embodiment of the present invention contains a barium titanate-based compound as a primary component and, as subcomponents, at least Al and Si.

Since having a perovskite type crystal structure represented by a general formula of $ABO_3$ and a relatively high specific dielectric constant, a barium titanate-based compound has been widely used for the application of a multilayer ceramic capacitor having a high dielectric constant.

As for this barium titanate-based compound, as a concrete form thereof, for example, there may be mentioned $BaTiO_3$ in which the A site and the B site are substituted by Ba and Ti, respectively; $(Ba,Ca)TiO_3$, $(Ba,Sr)TiO_3$, or $(Ba,Ca,Sr)TiO_3$ in which Ba is partially substituted by at least one type of Ca and Sr; or $Ba(Ti,Zr)O_3$, $Ba(Ti,Hf)O_3$, or $Ba(Ti,Zr,Hf)O_3$ in which Ti is partially substituted by at least one type of Zr and Hf.

In addition, although the compound molar ratio of the A site to the B site is 1.000 in terms of stoichiometry, if necessary, compounding may also be preferably performed to be an A-site excess or a B-site excess so as not to adversely influence various characteristics, the sintering characteristics, and the like.

In addition, this dielectric ceramic contains at least Al and Si as the subcomponents, the total (hereinafter referred to as "total molar amount) (Al+Si) of the content molar amounts of the Al and the Si is 2 to 4 parts by mole with respect to 100 parts by mole of Ti, and the content ratio (Al/(Al+Si)) of Al to the above total molar amount is set to 0.2 or less (excluding 0) on the molar ratio basis.

That is, the total molar amount (Al+Si) with respect to 100 parts by mole of Ti satisfies the following equation (1), and the content ratio of Al to the total molar amount (Al/Al+Si) satisfies the following equation (2).

$$2 \leq Al+Si \leq 4 \tag{1}$$

$$0 < Al/(Al+Si) \leq 0.2 \tag{2}$$

When Al and Si are contained in the dielectric ceramic so as to satisfy the equations (1) and (2), the sintering characteristics and the grain growth during firing can be improved, and the dispersibility of Al and Si can also be improved. Accordingly, even if a high electric field is continuously applied for a long time in a high-temperature atmosphere or a high-temperature and high-humidity atmosphere, the generation of malfunction can be suppressed, so that desired high reliability can be preferably obtained.

The reasons the content molar amounts of Al and Si and the content ratios thereof are set so as to satisfy the equations (1) and (2) are as follows.

Al$_2$O$_3$ containing Al and SiO$_2$ containing Si both have a function as a firing auxiliary agent and promote the densification of an object to be fired during firing. In addition, as a result, even if a high electric field is continuously applied for a long time in a high-temperature atmosphere or a high-temperature and high-humidity atmosphere, the generation of malfunction can be suppressed, and hence, desired high reliability can be preferably obtained.

However, when the total molar amount of Al and Si is less than 2 parts by mole with respect to 100 parts by mole of Ti, the total molar amount of Al and Si is small, and as a result, the densification is not sufficiently performed during firing, and the sintering characteristics are degraded. Accordingly, since the electric field may be locally concentrated in some cases, a high-temperature load life and a high-humidity load life are degraded, and sufficient reliability may not be ensured in some cases.

On the other hand, when the total molar amount of Al and Si is more than 4 parts by mole with respect to 100 parts by mole of Ti, sintering of a ceramic raw material powder excessively proceeds, and abnormal grain growth of crystal grains is liable to occur. Hence, in this case, a high-temperature load life and a high-humidity load life are also degraded as in the case described above, and sufficient reliability may not be ensured in some cases.

Furthermore, when one of Al and Si is only contained, sufficiently high reliability cannot be obtained, and hence, in order to ensure desired high reliability, both Al and Si are required to be contained. In addition, when Al is excessively contained, due to the unbalance in compounding ratio, desired reliability also may not be obtained as is the case described above.

In particular, when the content ratio of Al with respect to the total molar amount of Al and Si is 0, that is, when the (Al/(Al+Si)) value is 0, since Al is not contained, desired reliability may not be ensured in some cases.

In contrast, when the (Al/(Al+Si)) value is more than 0.20, the content molar amount of Al with respect to that of Si is excessive, and as in the case described above, desired reliability also may not be ensured in some cases.

As described above, in this dielectric ceramic, when Al and Si are contained so as to satisfy the above equations (1) and (2), desired high reliability can be preferably ensured.

Incidentally, the existence forms of Al and Si in the dielectric ceramic are not particularly limited, and for example, the element described above may be solid-soluted with the primary component in crystal grains or may be present in a crystal grain boundary or at a crystal triple point. In addition, as the compound form, an oxide form, such as Al$_2$O$_3$ or SiO$_2$, or a composite oxide form also containing another element may be mentioned.

As described above, this dielectric ceramic contains Al and Si as well as a barium titanate-based compound having a perovskite type crystal structure as a primary component, the total molar amount of Al and Si is 2 to 4 parts by mole with respect to 100 parts by mole of Ti, and the Al/(Al+Si) value is 0.2 or less (excluding 0) on the mole ratio basis; hence, the sintering properties and the grain growth during firing can be controlled, and furthermore, the dispersibility of Al and Si can also be controlled. Accordingly, even if a high electric field is continuously applied for a long time in a high-temperature atmosphere or a high-temperature and high-humidity atmosphere, a dielectric ceramic which can suppress the generation of malfunction and which has preferable reliability thereby can be obtained.

In addition, this dielectric ceramic may preferably contain besides Al and Si, a rare earth element Re as a subcomponent. Since having a transfer suppression effect of oxygen holes, the rare earth element Re contributes to the improvement in reliability. In addition, as the rare earth element Re as described above, at least one type selected from Sm, Eu, Gd, Tb, Dy, Ho, Er, Tm, Yb, and Lu is preferably used, and among those mentioned above, Gd, Tb, and Dy are particularly preferable.

By addition of the rare earth element Re as described above, a high-temperature load life and a high-humidity load life can be further improved, and more preferable reliability can be obtained.

In particular, when the content molar amount of the specific rare earth element Re mentioned above is 0.95 to 2.0 parts by mole with respect to 100 parts by mole of Ti, further preferable reliability can be ensured.

In addition, as the subcomponent, Mg, Mn, V, and Zr may also be preferably contained in the dielectric ceramic, and when the subcomponents as described above are contained, more preferable reliability can be obtained.

In particular, when 0.10 to 2.0 parts by mole of Mg, 0.01 to 0.3 parts by mole of Mn, 0.01 to 3.0 parts by mole of V, and 0.2 to 0.8 parts by mole of Zr are contained with respect to 100 parts by mole of Ti, further preferable reliability can be ensured.

In addition, the existence form of each of the specific rare earth element Re, Mg, Mn, V, and Zr is not particularly limited, and for example, the element described above may be solid-soluted with the primary component in crystal grains or may be present in a crystal grain boundary or at a crystal triple point. In addition, as the compound form, an oxide form, such as Re$_2$O$_3$ or MgO, or a composite oxide form also containing another element may be mentioned.

Next, a multilayer ceramic capacitor using the dielectric ceramic described above will be described in detail.

Figure 1:
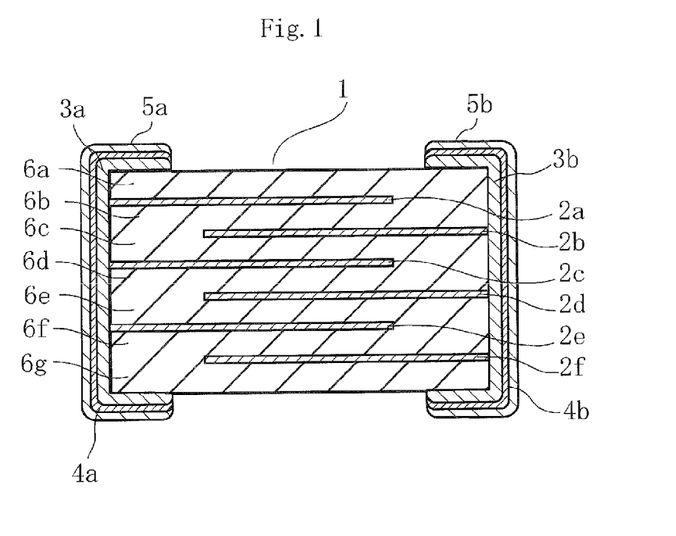
FIG. 1 is a cross-sectional view schematically showing on embodiment of a multilayer ceramic capacitor of the present invention.

FIG. 1 is a cross-sectional view schematically showing one embodiment of the multilayer ceramic capacitor described above.

In the multilayer ceramic capacitor, internal electrode layers 2a to 2f are buried in a ceramic sintered body 1, external electrodes 3a and 3b are also formed on two end portions of the ceramic sintered body 1, and on the surfaces of the external electrodes 3a and 3b, first plating films 4a and 4b and second plating films 5a and 5b are further formed, respectively.

That is, dielectric layers 6a to 6g and the internal electrode layers 2a to 2f are alternately laminated to each other and are then fired to form the ceramic sintered body 1, the internal electrode layers 2a, 2c, and 2e are electrically connected to the external electrode 3a, and the internal electrode layers 2b, 2d, and 2f are electrically connected to the external electrode 3b. In addition, the internal electrode layers 2a, 2c, and 2e and the internal electrode layers 2b, 2d, and 2f form an electrostatic capacitance between facing surfaces thereof.

In addition, the dielectric layers 6a to 6g are each formed from the dielectric ceramic described above.

In addition, although an internal electrode material forming the internal electrode layers 2a to 2f is not particularly limited, a material containing, as a primary component, Ni which is inexpensive and has good electrically conductive properties is preferably used.

Accordingly, even if the thickness of the dielectric ceramic layer can be reduced to 1 μm or less, and a high electric field is continuously applied for a long time in a high-temperature atmosphere or a high-temperature and high-humidity atmosphere, the generation of malfunction can be suppressed, so that a multilayer ceramic capacitor having high reliability can be obtained.

In particular, when the thickness of each of the internal electrode layers 2a to 2f is 0.6 µm or less, significantly excellent high reliability can be obtained. That is, when the thickness of each of the internal electrode layers 2a to 2f is increased to more than 0.6 µm, Al in the dielectric layers 6a to 6g may diffuse to internal electrode layers 2a to 2f sides in some cases; however, when the thickness of each of the internal electrode layers 2a to 2f is set to 0.6 µm or less, the diffusion of Al to the insides of the internal electrode layers 2a to 2g can be suppressed, and as a result, significantly excellent high reliability can be obtained.

Next, a method for manufacturing the multilayer ceramic capacitor described above will be described in detail.

First, as primary raw materials, a Ba compound, a Ti compound, and the like are prepared. Next, after predetermined amounts of those primary raw materials are weighed, the materials thus weighed are charged into a ball mill together with purified water and a grinding medium, such as PSZ (partially stabilized zirconia) balls, are then sufficiently mixed and pulverized by a wet method, and are further dried. Subsequently, a heat treatment is performed at a temperature of 900° C. to 1,200° C. for a predetermined time, so that a primary component powder formed of a barium titanate-based compound having an average grain diameter of 0.1 to 0.2 µm is formed.

Next, as subcomponent powders, an Al oxide and a Si oxide are prepared together with, if needed, an Re oxide containing a specific rare earth element Re, an Mg oxide, an Mn oxide, a V oxide, and a Zr oxide. After those subcomponent powders are weighed in predetermined amounts and are then added to the primary component powder, the mixture thus obtained is charged into a ball mill together with a grinding medium and is then sufficiently mixed by a wet method so as to be uniformly dispersed. Subsequently, by performing drying, a ceramic raw material powder is formed.

Next, this ceramic raw material powder is charged into a ball mill together with an organic binder, a plasticizer, an organic solvent, and a grinding medium, and is wet mixed therewith to form a ceramic slurry, and this ceramic slurry is processed by a doctor blade method or the like, so that ceramic green sheets are each formed so that the thickness thereof to be obtained after firing is 1 µm or less.

Subsequently, an electrically conductive material, such as a Ni powder, is mixed with an organic vehicle and an organic solvent, and is then kneaded by a three-roll mill or the like, so that an electrically conductive paste for an internal electrode is formed.

Next, by the use of this electrically conductive paste for an internal electrode, a screen printing is performed on ceramic green sheets so that the thickness to be obtained after firing is preferably 0.6 µm or less, thereby forming an electrically conductive film having a predetermined pattern on the surface of each of the ceramic green sheets described above.

Subsequently, after the ceramic green sheets each provided with the electrically conductive film are laminated to each other in a predetermined direction, the laminate thus formed is sandwiched with ceramic green sheets which are not provided with the electrically conductive films, is then pressure bonded thereto, and is further cut to have predetermined dimensions, so that a ceramic laminate is formed. Next, after a de-binder treatment is performed at a temperature of 300° C. to 500° C., a firing treatment is further performed for approximately 2 hours at a temperature of 1,100° C. to 1,300° C. in a reducing atmosphere containing a $H_2$—$N_2$—$H_2O$ gas in which the oxygen partial pressure is controlled at $10^{-9}$ to $10^{-12}$ MPa. Accordingly, the electrically conductive films and the ceramic green sheets are co-sintered, so that the ceramic sintered body 1 in which the dielectric ceramic layers 6a to 6g and the internal electrode layers 2a to 2f are alternately laminated to each other is obtained.

Subsequently, after an electrically conductive paste for an external electrode is applied to two end surfaces of the ceramic sintered body 1, a baking treatment is performed at a temperature of 600° C. to 800° C., so that the external electrodes 3a and 3b are formed.

In addition, although an electrically conductive material contained in the electrically conductive paste for an external electrode is also not particularly limited, in order to reduce the cost, Ag, Cu, or a material containing an alloy thereof as a primary component is preferably used.

In addition, as a method for forming the external electrodes 3a and 3b, a method may be used in which the electrically conductive paste for an external electrode is applied to two end surfaces of the ceramic laminate and is then processed by a firing treatment together therewith.

Next, finally, first plating films 4a and 4b each composed of Ni, Cu, a Ni—Cu alloy, or the like are formed on the surfaces of the external electrodes 3a and 3b by electroplating, and second plating films 5a and 5b each composed of solder, tin, or the like are further formed on the surfaces of the first plating films 4a and 4b, so that a multilayer ceramic capacitor can be formed.

As described above, in this embodiment, even if the thickness of each of the dielectric layers 6a to 6g is reduced to 1 µm or less, and a high electric field is continuously applied for a long time in a high-temperature atmosphere or a high-temperature and high-humidity atmosphere, the generation of malfunction can be suppressed, so that a multilayer ceramic capacitor having high reliability can be obtained. In particular, when the thickness of each of the internal electrode layers 2a to 2f is 0.6 µm or less, significantly excellent high reliability can be obtained.

Incidentally, the present invention is not limited at all to the embodiments described above and, of course, may be variously changed and modified without departing from the scope of the present invention.

Next, examples of the present invention will be described in detail.

EXAMPLE 1

Formation of Test Sample

After predetermined amounts of $BaCO_3$ and $TiO_2$ as primary component raw materials were weighed and charged into a ball mill together with PSZ balls and purified water, mixing and pulverizing were sufficiently performed by a wet method, and drying was then performed. Subsequently, after a heat treatment was performed at a temperature of 1,150° C. for approximately 2 hours, a primary component powder formed of $BaTiO_3$ having an average grain diameter 0.15 µm was formed.

Next, as subcomponent raw materials, $Al_2O_3$, $SiO_2$, $MgCO_3$, $Ho_2O_3$, $MnO_2$, $V_2O_5$, and $ZrO_2$ were prepared. Subsequently, $MgCO_3$, $Ho_2O_3$, $MnO_2$, $V_2O_5$, and $ZrO_2$ were weighed so that with respect to 100 parts by mole of Ti, the contents of Mg, Ho, Mn, V, and Zr were set to 1.10, 0.80, 0.15, 0.15, and 0.10 parts by mole, respectively. Furthermore, $Al_2O_3$ and $SiO_2$ were weighed so that with respect to 100 parts by mole of Ti, the content of Al was set to 0 to 3.00 parts by mole, and the content of Si was set to 1.00 to 5.00 parts by mole, and so that the content molar amount of Al with respect to the total molar amount of Al and Si was set to 0 to 0.750 on the molar ratio basis.

Next, those compounds thus weighed were added to the above primary component powder, and the mixture thus formed was charged into a ball mill together with PSZ balls and purified water and was then sufficiently mixed and pulverized by a wet method so as to be uniformly dispersed. Subsequently, a drying treatment was performed, so that a ceramic raw material powder was obtained.

In addition, when the components of this ceramic raw material powder were analyzed using an induction coupled plasma (ICP) emission spectroscopic method, it was confirmed that the components were approximately the same as those of the compound composition.

Next, the ceramic raw material powder described above was charged into a ball mill together with ethanol, a poly (vinyl butyral)-based binder, a plasticizer, PSZ balls, and ethanol as an organic solvent and was mixed therewith by a wet method, so that a ceramic slurry was formed. Furthermore, the ceramic slurry was formed into ceramic green sheets by molding using a doctor blade method so that the thickness thereof to be obtained after firing was 0.8 µm.

Subsequently, an electrically conductive paste for an internal electrode, the paste containing a Ni powder, an organic vehicle, and an organic solvent, was prepared.

Next, by the use of this electrically conductive paste for an internal electrode, screen printing was performed on ceramic green sheets so that the internal electrode layers to be obtained by firing had a thickness of 0.7 µm, thereby forming an electrically conductive film having a predetermined pattern on the surface of each of the ceramic green sheets described above.

Subsequently, a predetermined number of ceramic green sheets provided with the electrically conductive films were laminated to each other, were then sandwiched with ceramic green sheets provided with no electrically conductive films, and were furthermore pressure bonded thereto. Next, the ceramic green sheets thus pressure bonded were cut into a ceramic laminate having predetermined dimensions. Subsequently, a de-binder treatment was performed in a nitrogen atmosphere at a temperature of 300° C. for 3 hours, and a firing treatment was further performed for approximately 2 hours at a temperature of 1,200° C. in a reducing atmosphere containing a $H_2$—$N_2$—$H_2O$ gas in which the oxygen partial pressure was controlled at $10^{-9}$ to $10^{-12}$ MPa. Accordingly, the electrically conductive films and the ceramic green sheets were co-sintered, so that a ceramic sintered body in which the internal electrode layers were buried was formed.

In addition, after this ceramic sintered body was melted, the components thereof were analyzed using an ICP emission spectroscopic method, and it was confirmed that the composition was approximately the same as the compound composition.

Next, an electrically conductive paste for an external electrode, the paste containing a Cu powder and a $B_2O_3$—$Li_2O$—$SiO_2$—BaO-based glass frit, was prepared. In addition, after this electrically conductive paste for an external electrode was applied to two end surfaces of the ceramic sintered body, a baking treatment was performed in a nitrogen atmosphere at a temperature of 800° C. to form external electrodes, so that test samples of Sample Nos. 1 to 28 were formed.

Figure 2:
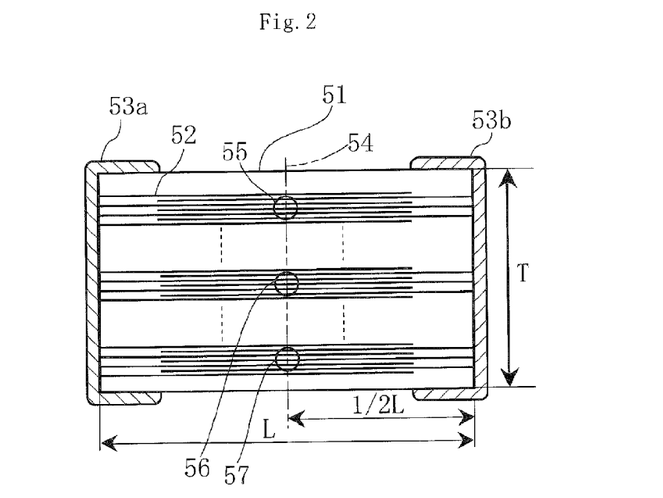
FIG. 2 is a cross-sectional view of a test sample illustrating a measurement method of the thickness of an internal electrode.

FIG. 2 is a cross-sectional view showing the internal structure of the test sample. That is, in each of the above samples, as described above, internal electrode layers 52 were buried in a ceramic sintered body 51, and external electrodes 53a and 53b were also formed on the two end portions of the ceramic sintered body 51.

The thickness of the dielectric layer of each test sample thus obtained was 0.8 µm, the thickness of the internal electrode layer was 0.7 µm, and as for the external dimensions, a length L, a width W, and a thickness T were 0.6, 0.3, and 0.3 mm, respectively. In addition, a facing electrode area per one dielectric layer was 0.5 $mm^2$, and the effective number of laminated layers was 200.

In addition, the thickness of the internal electrode layer 52 was measured by the following method.

First, after the test sample was held so the width (W) direction thereof (direction perpendicular to the plane of this figure) was set along the vertical direction, the test sample was fixed with a resin provided around the periphery thereof.

Subsequently, the ceramic sintered body 51 was polished in the width direction so that the LT surface defined by the length L (=0.6 mm) and the thickness T (=0.3 mm) was exposed, and the LT surface was polished by a polishing machine until the width dimension W was reduced to approximately ½ W.

In order to eliminate a sag of the internal electrode layer caused by polishing, after the polishing was completed, the polished surface was processed by an ion milling method.

Next, along a central line 54 which is located ½ L apart from the end portion of the length L of the ceramic sintered body 51 and which is perpendicular to the internal electrode layers 52, the ceramic sintered body 51 was equally divided into three regions in the thickness T direction, and the respective regions were called an upper region 55, an intermediate region 56, and a lower region 57. In addition, in each of the upper region 55, the intermediate region 56, and the lower region 57, the thicknesses of 5 internal electrode layers 52 other than the outermost layers were measured using a scanning electron microscope, and the average value obtained from those measurement results was regarded as the thickness of the internal electrode layer 52.

[Evaluation of Test Sample]

A high-temperature load test and a high-humidity load test in a high-temperature and high-humidity atmosphere were performed on 70 test samples of each of Sample Nos. 1 to 28, and the reliability was evaluated.

In this evaluation, the high-temperature load test was performed such that a direct-current voltage of 6.3 V was applied between the external electrodes 53a and 53b at a temperature of 85° C., and an insulating resistance IR at room temperature was measured at 1,000 and 2,000 hours from the start of the test. In addition, a test sample having an insulating resistance IR of 1 MΩ or less was judged as a defective, and the reliability in a high-temperature atmosphere was evaluated.

In addition, the high-humidity load test was performed such that a direct-current voltage of 6.3 V was applied between the external electrodes 53a and 53b at a temperature of 85° C. and a relative humidity of 85%, and as was the case of the high-temperature load test, an insulating resistance IR at room temperature was measured at 1,000 and 2,000 hours from the start of the test. In addition, a test sample having an insulating resistance IR of 1 MΩ or less was judged as a defective, and the reliability in a high-humidity atmosphere was evaluated.

Table 1 show the content molar amounts of Al and Si of the test sample of each of Sample Nos. 1 to 28 with respect to 100 parts by mole of Ti, the total molar amount of Al and Si, the Al/(Al+Si) value, and the measurement results of the high-temperature load test and the high-humidity load test.

TABLE 1

| Sample No. | Content Molar Amount (Parts by Mole) | | | | High-Temperature Load Test Number of Defectives | | High-Humidity Load Test Number of Defectives | |
|---|---|---|---|---|---|---|---|---|
| | Al | Si | Al + Si | Al/(Al + Si) | 1000 Hours | 2000 Hours | 1000 Hours | 2000 Hours |
| 1*[1] | 0 | 1.00 | 1.00 | 0 | 3/70 | 4/70 | 4/70 | 5/70 |
| 2*[1] | 0 | 2.00 | 2.00 | 0 | 5/70 | 7/70 | 7/70 | 9/70 |
| 3*[1] | 0 | 3.00 | 3.00 | 0 | 2/70 | 4/70 | 3/70 | 5/70 |
| 4*[1] | 0 | 5.00 | 5.00 | 0 | 2/70 | 7/70 | 3/70 | 9/70 |
| 5*[1] | 0.10 | 1.00 | 1.10 | 0.091 | 0/70 | 4/70 | 0/70 | 5/70 |
| 6 | 0.10 | 2.00 | 2.10 | 0.048 | 0/70 | 0/70 | 0/70 | 0/70 |
| 7 | 0.10 | 3.00 | 3.10 | 0.032 | 0/70 | 0/70 | 0/70 | 0/70 |
| 8*[1] | 0.10 | 5.00 | 5.10 | 0.020 | 2/70 | 7/70 | 3/70 | 9/70 |
| 9*[1] | 0.25 | 1.00 | 1.25 | 0.200 | 0/70 | 3/70 | 0/70 | 2/70 |
| 10 | 0.25 | 2.00 | 2.25 | 0.111 | 0/70 | 0/70 | 0/70 | 0/70 |
| 11 | 0.25 | 3.00 | 3.25 | 0.077 | 0/70 | 0/70 | 0/70 | 0/70 |
| 12*[1] | 0.25 | 5.00 | 5.25 | 0.048 | 2/70 | 6/70 | 1/70 | 5/70 |
| 13*[1] | 0.50 | 1.00 | 1.50 | 0.333 | 0/70 | 3/70 | 0/70 | 4/70 |
| 14 | 0.50 | 2.00 | 2.50 | 0.200 | 0/70 | 0/70 | 0/70 | 0/70 |
| 15 | 0.50 | 3.00 | 3.50 | 0.143 | 0/70 | 0/70 | 0/70 | 0/70 |
| 16*[1] | 0.50 | 5.00 | 5.50 | 0.091 | 5/70 | 10/70 | 4/70 | 9/70 |
| 17*[1] | 1.00 | 1.00 | 2.00 | 0.500 | 0/70 | 2/70 | 0/70 | 1/70 |
| 18*[1] | 1.00 | 2.00 | 3.00 | 0.333 | 2/70 | 4/70 | 3/70 | 4/70 |
| 19*[1] | 1.00 | 3.00 | 4.00 | 0.250 | 3/70 | 7/70 | 2/70 | 6/70 |
| 20*[1] | 1.00 | 5.00 | 6.00 | 0.167 | 2/70 | 5/70 | 2/70 | 4/70 |
| 21*[1] | 2.00 | 1.00 | 3.00 | 0.667 | 0/70 | 1/70 | 0/70 | 2/70 |
| 22*[1] | 2.00 | 2.00 | 4.00 | 0.500 | 3/70 | 6/70 | 2/70 | 5/70 |
| 23*[1] | 2.00 | 3.00 | 5.00 | 0.400 | 2/70 | 4/70 | 3/70 | 7/70 |
| 24*[1] | 2.00 | 5.00 | 7.00 | 0.286 | 1/70 | 4/70 | 2/70 | 5/70 |
| 25*[1] | 3.00 | 1.00 | 4.00 | 0.750 | 2/70 | 4/70 | 3/70 | 5/70 |
| 26*[1] | 3.00 | 2.00 | 5.00 | 0.600 | 5/70 | 9/70 | 2/70 | 7/70 |
| 27*[1] | 3.00 | 3.00 | 6.00 | 0.500 | 3/70 | 7/70 | 4/70 | 6/70 |
| 28*[1] | 3.00 | 5.00 | 8.00 | 0.375 | 6/70 | 12/70 | 8/70 | 15/70 |

*[1]indicates out of the range of the present invention.

In Sample Nos. 1 to 4, although Si was contained in the dielectric layer, since no Al was contained at all, the sintering properties were inferior. As a result, when 1,000 hours passed from the start of the test, several defectives were already generated in the high-temperature load test and the high-humidity load test, and in addition, when 2,000 hours passed from the start of the test, the number of defectives was increased. Hence, it was found that the reliability was inferior.

In addition, in Sample No. 5, although both Al and Si were contained in the dielectric layer, the total molar amount of Al and Si with respect to 100 parts by mole of Ti was small, such as 1.10 parts by mole. As a result, when 1,000 hours passed from the start of this test, although no defectives were generated in the high-temperature load test and the high-humidity load test, when 2,000 hours passed from the start of the test, 4 defectives were generated out of 70 in the high-temperature load test, and 5 defectives were generated out of 70 in the high-humidity load test. Hence, it was found that the reliability could not be sufficiently ensured.

In Sample Nos. 8 and 12, since the total molar amount of Al and Si with respect to 100 parts by mole of Ti was excessively contained in a range of 5.10 to 5.25 parts by mole, the crystal grains were abnormally grown. As a result, in both the high-temperature load test and the high-humidity load test, when 1,000 hours passed from the start of the test, a small number of defectives were generated, and when 2,000 hours passed from the start of the test, the number of defectives was increased. Hence, it was found that the reliability could not be sufficiently ensured.

In Sample Nos. 9 and 13, since the total molar amount of Al and Si with respect to 100 parts by mole of Ti was small, such as 1.25 or 1.50 parts by mole, the sintering properties were inferior. As a result, although no defectives were generated in both the high-temperature load test and the high-humidity load test when 1,000 hours passed from the start of the test, when 2,000 hours passed from the start of the test, 3 defectives were generated out of 70 in the high-temperature load test, and 2 to 4 defectives were generated out of 70 in the high-humidity load test. Hence, it was found that the reliability could not be sufficiently ensured. In addition, as compared to Sample No. 9, in Sample No. 13, the reliability in the high-humidity load test was further degraded, and the reason for this is believed that since Al/(Al+Si) was more than 0.20, such as 0.333, the content molar amount of Si was relatively smaller than that of Al, and the sintering properties were further degraded.

In Sample Nos. 16 to 28, since at least one of the total molar amount of Al and Si and the Al(Al+Si) value was out of the range of the present invention, when 2,000 hours passed from the start of the test, defectives were generated in both the high-temperature load test and the high-humidity load test, and it was found that reliability could not be sufficiently ensured.

On the other hand, in Sample Nos. 6, 7, 10, 11, 14, and 15, since the total molar amount of Al and Si with respect to 100 parts by mole of Ti was in a range of 2.10 to 3.50 parts by mole, and the Al(Al+Si) value was 0.2 or less, even when 2,000 hours passed from the start of the test, no defectives were generated at all, so that it was found that high-temperature load characteristics and high-humidity load characteristics were excellent, and that high reliability could be obtained.

EXAMPLE 2

Rare earth element oxides $Re_2O_3$ containing Sm, Eu, Gd, Tb, Dy, Ho, Er, Tm, Yb, and Lu as the rare earth elements Re were prepared. In addition, as was the case of Example 1, $Al_2O_3$, $SiO_2$, $MgCO_3$, $MnO_2$, $V_2O_5$, and $ZrO_2$ were prepared. In addition, except that the subcomponents were weighed so that with respect to 100 parts by mole of Ti, the contents of Al, Si, and each rare earth element Re were 0.25, 2.00, and 0.80 parts by mole, respectively, test samples of Sample Nos. 31 to 40 were formed by a method and a procedure similar to those of [Example 1]. In addition, the Al(Al+Si) value of each test sample of this Example 2 was set to 0.11 and was in the range of the present invention.

Next, a high-temperature load test and a high-humidity load test were performed on the test samples of Sample Nos. 31 to 40 by a method and a procedure similar to those of [Example 1], and the reliability was evaluated. In addition, in this Example 2, the evaluation of the reliability was performed based on the number of defectives generated when 2,000 hours and 3,000 hours passed from the start of the high-temperature load test and the high-humidity load test.

Table 2 shows the type of rare earth element Re contained in the test sample of each of Sample Nos. 31 to 40 and the measurement results of the high-temperature load test and the high-humidity load test.

TABLE 2

| Sample No. | Rare Earth Element Re | High-Temperature Load Test Number of Defectives | | High-Humidity Load Test Number of Defectives | |
|---|---|---|---|---|---|
| | | 2000 Hours | 3000 Hours | 2000 Hours | 3000 Hours |
| 31*[2] | Sm | 0/70 | 2/70 | 0/70 | 3/70 |
| 32*[2] | Eu | 0/70 | 3/70 | 0/70 | 4/70 |
| 33 | Gd | 0/70 | 0/70 | 0/70 | 0/70 |
| 34 | Tb | 0/70 | 0/70 | 0/70 | 0/70 |
| 35 | Dy | 0/70 | 0/70 | 0/70 | 0/70 |
| 36*[2] | Ho | 0/70 | 3/70 | 0/70 | 4/70 |
| 37*[2] | Er | 0/70 | 2/70 | 0/70 | 3/70 |
| 38*[2] | Tm | 0/70 | 4/70 | 0/70 | 5/70 |
| 39*[2] | Yb | 0/70 | 2/70 | 0/70 | 3/70 |
| 40*[2] | Lu | 0/70 | 4/70 | 0/70 | 5/70 |

*[2]indicates out of the range of the present invention.

As apparent from this Table 2, in all the test samples of Sample Nos. 31 to 40, the generation of defectives was not observed at all when 2,000 hours passed from the start of the test.

In addition, as apparent from the comparison between Sample Nos. 33 to 35 and Sample Nos. 31, 32, and 36 to 40, in the test samples in which a rare earth element Re other than Gd, Tb, and Dy was used, although defectives were generated when 3,000 hours passed from the start of the test, in the test samples in which Gd, Tb, and Dy were used as the rare earth element Re, no defectives were generated even when 3,000 hours passed from the start of the test. Hence, it was found that by the use of Gd, Tb, and Dy as the rare earth element Re, more preferable reliability could be obtained.

EXAMPLE 3

Except that after $Al_2O_3$, $SiO_2$, $Dy_2O_3$, $MgCO_3$, $MnO_2$, $V_2O_5$, and $ZrO_2$ were prepared as the subcomponent raw materials, the contents of Al and Si were set constant at 0.25 parts by mole and 2.00 parts by mole, respectively, with respect to 100 parts by mole of Ti, and the content molar amounts of Dy, Mg, Mn, V, and Zr with respect to 100 parts by mole of Ti were changed, test samples of Sample Nos. 41 to 60 were formed by a method and a procedure similar to those of [Example 1]. In addition, the Al(Al+Si) value of each test sample of this Example 3 was also set to 0.11 as in the case of [Example 2] and was in the range of the present invention.

Next, the reliability of the test sample of each of Sample Nos. 41 to 60 was evaluated by a method and a procedure similar to those of [Example 1]. In addition, in this Example 3, the evaluation of the reliability was performed based on the number of defectives generated when 3,000 hours and 4,000 hours passed from the start of the high-temperature load test and the high-humidity load test.

Table 3 shows the content molar amounts of Dy, Mg, Mn, V, and Zr contained in the test sample of each of Sample Nos. 41 to 60 with respect to 100 parts by mole of Ti, and the measurement results of the high-temperature load test and the high-humidity load test.

TABLE 3

| Sample No. | Content Molar Amount (Parts by Mole) | | | | | High-Temperature Load Test Number of Defectives | | High-Humidity Load Test Number of Defectives | |
|---|---|---|---|---|---|---|---|---|---|
| | Dy | Mg | Mn | V | Zr | 3000 Hours | 4000 Hours | 3000 Hours | 4000 Hours |
| 41*[3] | 0.80 | 1.10 | 0.15 | 0.15 | 0.40 | 0/70 | 2/70 | 0/70 | 3/70 |
| 42 | 0.95 | 1.10 | 0.15 | 0.15 | 0.40 | 0/70 | 0/70 | 0/70 | 0/70 |
| 43 | 2.00 | 1.10 | 0.15 | 0.15 | 0.40 | 0/70 | 0/70 | 0/70 | 0/70 |
| 44*[3] | 2.30 | 1.10 | 0.15 | 0.15 | 0.40 | 0/70 | 3/70 | 0/70 | 5/70 |
| 45*[3] | 1.40 | 0.00 | 0.15 | 0.15 | 0.40 | 0/70 | 2/70 | 0/70 | 2/70 |

TABLE 3-continued

| Sample No. | Content Molar Amount (Parts by Mole) | | | | | High-Temperature Load Test Number of Defectives | | High-Humidity Load Test Number of Defectives | |
|---|---|---|---|---|---|---|---|---|---|
| | Dy | Mg | Mn | V | Zr | 3000 Hours | 4000 Hours | 3000 Hours | 4000 Hours |
| 46 | 1.40 | 0.10 | 0.15 | 0.15 | 0.40 | 0/70 | 0/70 | 0/70 | 0/70 |
| 47 | 1.40 | 2.00 | 0.15 | 0.15 | 0.40 | 0/70 | 0/70 | 0/70 | 0/70 |
| 48*[3] | 1.40 | 2.40 | 0.15 | 0.15 | 0.40 | 0/70 | 4/70 | 0/70 | 5/70 |
| 49*[3] | 1.40 | 1.10 | 0.00 | 0.15 | 0.40 | 0/70 | 2/70 | 0/70 | 3/70 |
| 50 | 1.40 | 1.10 | 0.01 | 0.15 | 0.40 | 0/70 | 0/70 | 0/70 | 0/70 |
| 51 | 1.40 | 1.10 | 0.30 | 0.15 | 0.40 | 0/70 | 0/70 | 0/70 | 0/70 |
| 52*[3] | 1.40 | 1.10 | 0.45 | 0.15 | 0.40 | 0/70 | 3/70 | 0/70 | 4/70 |
| 53*[3] | 1.40 | 1.10 | 0.15 | 0.00 | 0.40 | 0/70 | 1/70 | 0/70 | 2/70 |
| 54 | 1.40 | 1.10 | 0.15 | 0.01 | 0.40 | 0/70 | 0/70 | 0/70 | 0/70 |
| 55 | 1.40 | 1.10 | 0.15 | 0.30 | 0.40 | 0/70 | 0/70 | 0/70 | 0/70 |
| 56*[3] | 1.40 | 1.10 | 0.15 | 0.45 | 0.40 | 0/70 | 3/70 | 0/70 | 4/70 |
| 57*[3] | 1.40 | 1.10 | 0.15 | 0.15 | 0.10 | 0/70 | 2/70 | 0/70 | 3/70 |
| 58 | 1.40 | 1.10 | 0.15 | 0.15 | 0.20 | 0/70 | 0/70 | 0/70 | 0/70 |
| 59 | 1.40 | 1.10 | 0.15 | 0.15 | 0.80 | 0/70 | 0/70 | 0/70 | 0/70 |
| 60*[3] | 1.40 | 1.10 | 0.15 | 0.15 | 0.90 | 0/70 | 4/70 | 0/70 | 5/70 |

*[3] indicates out of the range of the present invention.

As apparent from this Table 3, in all the test samples of Sample Nos. 41 to 60, no defectives were generated at all when 3,000 hours passed from the start of the test, and preferable reliability could be obtained.

However, in Sample No. 41, since the content of Dy was small, such as 0.80 parts by mole, with respect to 100 parts by mole of Ti, when 4,000 hours passed from the start of the test, 2 defectives were generated out of 70 in the high-temperature load test, and 3 defectives were generated out of 70 in the high-humidity load test.

On the other hand, in Sample No. 44, since the content of Dy was large, such as 2.30 parts by mole, with respect to 100 parts by mole of Ti, when 4,000 hours passed from the start of the test, 3 defectives were generated out of 70 in the high-temperature load test, and 5 defectives were generated out of 70 in the high-humidity load test.

In contrast, in Sample Nos. 42 and 43, since the content of Dy was 0.95 to 2.00 parts by mole with respect to 100 parts by mole of Ti, even when 4,000 hours passed from the start of the test, no defectives were generated at all in the high-temperature load test and the high-humidity load test, and it was found that more preferable reliability could be ensured.

In addition, in Sample No. 45, since Mg was not contained, when 4,000 hours passed from the start of the test, 2 defectives were generated out of 70 in each of the high-temperature load test and the high-humidity load test.

On the other hand, in Sample No. 48, since the content of Mg was large, such as 2.40 parts by mole, with respect to 100 parts by mole of Ti, when 4,000 hours passed from the start of the test, 4 defectives were generated out of 70 in the high-temperature load test, and 5 defectives were generated out of 70 in the high-humidity load test.

In contrast, in Sample Nos. 46 and 47, since the content of Mg was 0.10 to 2.00 parts by mole with respect to 100 parts by mole of Ti, even when 4,000 hours passed from the start of the test, no defectives were generated at all in the high-temperature load test and the high-humidity load test, and it was found that more preferable reliability could be ensured.

In addition, in Sample No. 49, since Mn was not contained, when 4,000 hours passed from the start of the test, 2 defectives were generated out of 70 in the high-temperature load test, and 3 defectives were generated out of 70 in the high-humidity load test.

On the other hand, in Sample No. 52, since the content of Mn was large, such as 0.45 parts by mole, with respect to 100 parts by mole of Ti, when 4,000 hours passed from the start of the test, 3 defectives were generated out of 70 in the high-temperature load test, and 4 defectives were generated out of 70 in the high-humidity load test.

In contrast, in Sample Nos. 50 and 51, since the content of Mn was 0.01 to 0.30 parts by mole with respect to 100 parts by mole of Ti, even when 4,000 hours passed from the start of the test, no defectives were generated at all in the high-temperature load test and the high-humidity load test, and it was found that more preferable reliability could be ensured.

In addition, in Sample No. 53, since V was not contained, when 4,000 hours passed from the start of the test, 1 defective was generated out of 70 in the high-temperature load test, and 2 defectives were generated out of 70 in the high-humidity load test.

On the other hand, in Sample No. 56, since the content of V was large, such as 0.45 parts by mole, with respect to 100 parts by mole of Ti, when 4,000 hours passed from the start of the test, 3 defectives were generated out of 70 in the high-temperature load test, and 4 defectives were generated out of 70 in the high-humidity load test.

In contrast, in Sample Nos. 54 and 55, since the content of V was 0.01 to 0.30 parts by mole with respect to 100 parts by mole of Ti, even when 4,000 hours passed from the start of the test, no defectives were generated at all in the high-temperature load test and the high-humidity load test, and it was found that more preferable reliability could be ensured.

In addition, in Sample No. 57, since the content of Zr was small, such as 0.10 parts by mole, with respect to 100 parts by mole of Ti, when 4,000 hours passed from the start of the test, 2 defectives were generated out of 70 in the high-temperature load test, and 3 defectives were generated out of 70 in the high-humidity load test.

In addition, in Sample No. 60, since the content of Zr was large, such as 0.90 parts by mole, with respect to 100 parts by mole of Ti, when 4,000 hours passed from the start of the test, 4 defectives were generated out of 70 in the high-temperature load test, and 5 defectives were generated out of 70 in the high-humidity load test.

In contrast, in Sample Nos. 58 and 59, since the content of Zr was 0.20 to 0.80 parts by mole with respect to 100 parts by mole of Ti, even when 4,000 hours passed from the start of the test, no defectives were generated at all in the high-temperature load test and the high-humidity load test, and it was found that more preferable reliability could be ensured.

Accordingly, it was found that although the content molar amount of the subcomponent was not particularly limited, in order to obtain more preferable reliability, with respect to 100 parts by mole of Ti, the content of the rare earth element Re, such as Dy, was preferably 0.95 to 2.0 parts by mole, and the contents of Mg, Mn, V, and Zr were preferably 0.10 to 2.0, 0.01 to 0.3, 0.01 to 0.3, and 0.20 to 0.80 parts by mole, respectively.

EXAMPLE 4

As the subcomponent raw materials, $Al_2O_3$, $SiO_2$, $Ho_2O_3$, $MgCO_3$, $MnO_2$, $V_2O_5$, and $ZrO_2$ were prepared. In addition, except that $Al_2O_3$, $SiO_2$, $Ho_2O_3$, $MgCO_3$, $MnO_2$, $V_2O_5$, and $ZrO_2$ were weighed so that with respect to 100 parts by mole of Ti, the contents of Al, Si, Ho, Mg, Mn, V, and Zr were 0.25, 2.00, 1.40, 1.10, 0.15, 0.15, and 0.10 parts by mole, respectively, ceramic green sheets were formed by a method and a procedure similar to those of [Example 1].

Next, an electrically conductive paste for an internal electrode, the paste containing a Ni powder, an organic vehicle, and an organic solvent, was prepared.

Subsequently, by the use of this electrically conductive paste for an internal electrode, screen printing was performed on ceramic green sheets so that the thickness of the internal electrode layer to be obtained after firing was approximately 0.4 to 0.8 µm, thereby forming an electrically conductive film having a predetermined pattern on the surface of each of the ceramic green sheets described above.

Next, by a method and a procedure similar to those of [Example 1], test samples of Sample Nos. 71 to 77 were formed.

The thickness of the dielectric layer of the test sample thus obtained was 0.8 µm, and the thickness of the internal electrode layer was 0.43 to 0.85 µm. In addition, the thickness of the internal electrode layer was measured by a method and a procedure similar to those of [Example 1].

As for the external dimensions, the length L, the width W, and the thickness T were 0.6, 0.3, and 0.3 mm, respectively, as those of [Example 1], the facing electrode area per one dielectric layer was 0.5 $mm^2$, and the effective number of laminated layers was 200.

In addition, the thickness of the internal electrode layer was measured by a method similar to that of [Example 1].

Next, the high-temperature load characteristics and the high-humidity load characteristics of the test samples of Sample Nos. 71 to 77 were evaluated by a method and a procedure similar to those of [Example 1]. In addition, in this Example 4, the evaluation of the reliability was performed based on the number of defectives generated when 4,000 hours and 5,000 hours passed from the start of the high-temperature load test and the high-humidity load test.

Table 4 shows the thickness of the internal electrode layer and the measurement results of the high-temperature load test and the high-humidity load test of the test sample of each of Sample Nos. 71 to 77.

TABLE 4

| Sample No. | Thickness of Internal Electrode (µm) | High-Temperature Load Test Number of Defectives | | High-Humidity Load Test Number of Defectives | |
|---|---|---|---|---|---|
| | | 4000 Hours | 5000 Hours | 4000 Hours | 5000 Hours |
| 71*[4] | 0.85 | 0/70 | 2/70 | 0/70 | 3/70 |
| 72*[4] | 0.74 | 0/70 | 3/70 | 0/70 | 4/70 |
| 73*[4] | 0.65 | 0/70 | 2/70 | 0/70 | 2/70 |
| 74 | 0.60 | 0/70 | 0/70 | 0/70 | 0/70 |
| 75 | 0.56 | 0/70 | 0/70 | 0/70 | 0/70 |
| 76 | 0.51 | 0/70 | 0/70 | 0/70 | 0/70 |
| 77 | 0.43 | 0/70 | 0/70 | 0/70 | 0/70 |

*[4] indicates out of the range of the present invention.

As apparent from this Table 4, in all the test samples of Sample Nos. 71 to 77, no defectives were generated at all when 4,000 hours passed from the start of the test.

In addition, as apparent from the comparison between Sample Nos. 71 to 73 and Sample Nos. 74 to 77, when the thickness of the internal electrode layer was more than 0.6 µm, although defectives were generated when 5,000 hours passed from the start of the test, when the thickness of the internal electrode layer was 0.6 µm or less, no defectives were generated at all even when 5,000 hours passed from the start of the test. Hence, it was found that when the thickness of the internal electrode layer was set to 0.6 µm or less, more preferable reliability could be obtained.

Even if the thickness of the dielectric layer is reduced to 1 µm or less, and a high electric field is continuously applied for a long time in a high-temperature atmosphere or a high-temperature and high-humidity atmosphere, a multilayer ceramic capacitor having preferable high reliability in terms of a high-temperature load life and a high-humidity load life can be obtained.

REFERENCE SIGNS LIST 2a to 2f internal electrode layer
6a to 6g dielectric layer

The invention claimed is:
1. A dielectric ceramic containing:
 a barium titanate-based compound having a perovskite type crystal structure as a primary component;
 Al;
 Si;
 Mg;
 Mn;
 V; and
 Zr,
 wherein a total of content molar amounts of the Al and the Si is 2 parts by mole to 4 parts by mole with respect to 100 parts by mole of Ti,
 a content ratio of the Al with respect to the total of content molar amounts of the Al and the Si is 0.2 or less, excluding 0, on a molar ratio basis, and
 with respect to 100 parts by mole of the Ti,
 the Mg is 0.10 parts by mole to 2.0 parts by mole,
 the Mn is 0.01 parts by mole to 0.30 parts by mole,
 the V is 0.01 parts by mole to 0.30 parts by mole, and
 the Zr is 0.20 parts by mole to 0.80 parts by mole, respectively.
2. The dielectric ceramic according to claim 1, further containing a rare earth element Re.

3. The dielectric ceramic according to claim 2, wherein a content molar amount of the Re is 0.95 to 2.0 parts by mole with respect to 100 parts by mole of the Ti.

4. The dielectric ceramic according to claim 2, wherein the rare earth element Re includes at least one type selected from Sm, Eu, Gd, Tb, Dy, Ho, Er, Tm, Yb, and Lu.

5. The dielectric ceramic according to claim 2, wherein the rare earth element Re includes at least one type selected from Gd, Tb, and Dy.

6. A multilayer ceramic capacitor comprising:
a plurality of dielectric layers; and
internal electrode layers alternately laminated to the plurality of dielectric layers,
wherein the plurality of dielectric layers are each formed of the dielectric ceramic according to claim 1.

7. The multilayer ceramic capacitor according to claim 6, wherein the internal electrode layers each have a thickness of 0.6 μm or less.

8. The multilayer ceramic capacitor according to claim 6, wherein the internal electrode layers each contain Ni as a primary component.

9. A multilayer ceramic capacitor comprising:
a plurality of dielectric layers; and
internal electrode layers alternately laminated to the plurality of dielectric layers,
wherein the plurality of dielectric layers are each formed of the dielectric ceramic according to claim 2.

10. The multilayer ceramic capacitor according to claim 9, wherein the internal electrode layers each have a thickness of 0.6 μm or less.

11. The multilayer ceramic capacitor according to claim 9, wherein the internal electrode layers each contain Ni as a primary component.

* * * * *